Dec. 30, 1924.

F. RAU

ANTISKID DEVICE

Filed May 26, 1922  2 Sheets-Sheet 1

1,521,320

Fred Rau
INVENTOR

BY Victor J. Evans
ATTORNEY

WITNESS: E. Frahure

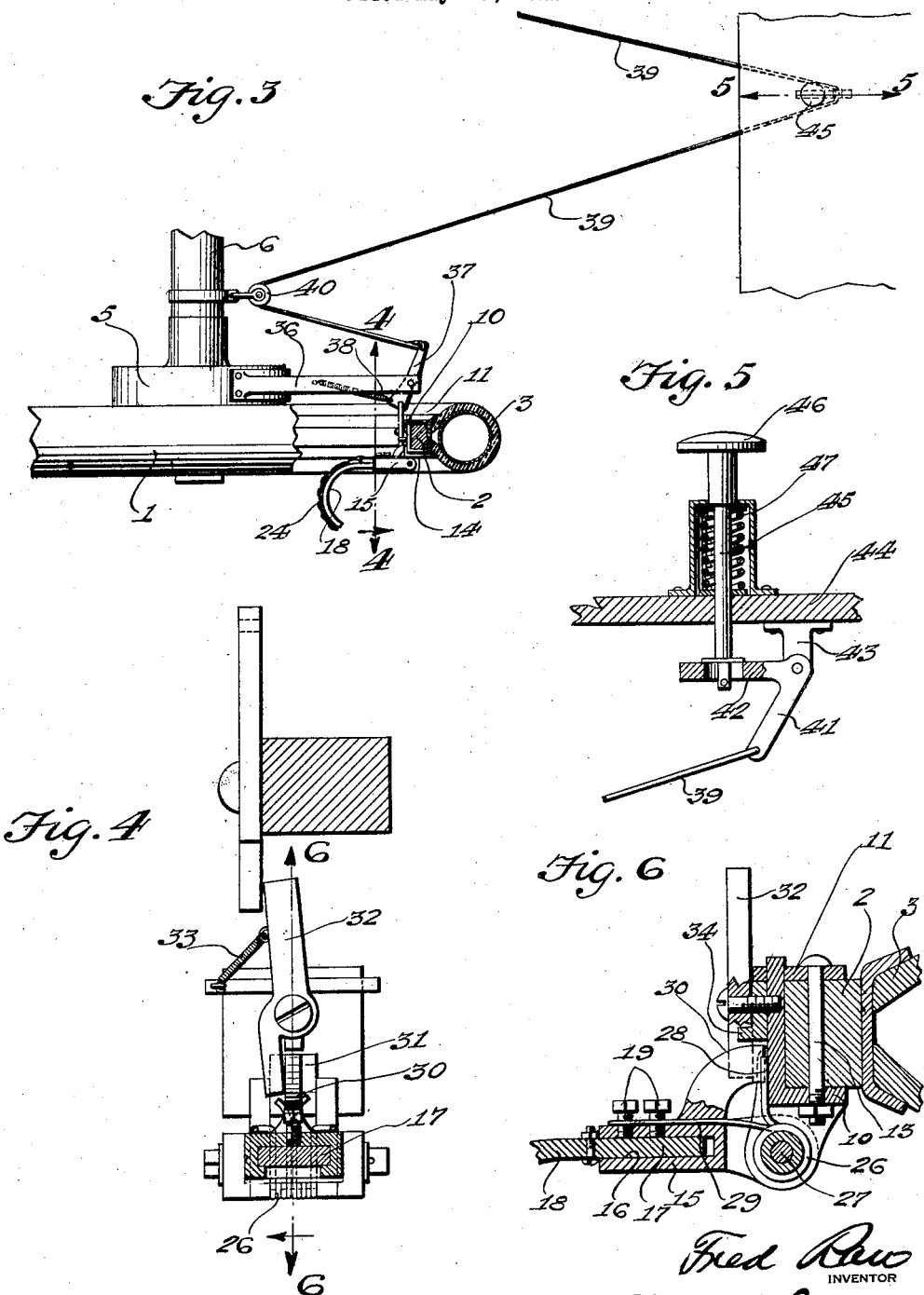

Patented Dec. 30, 1924.

1,521,320

UNITED STATES PATENT OFFICE.

FRED RAU, OF MILWAUKEE, WISCONSIN.

ANTISKID DEVICE.

Application filed May 26, 1922. Serial No. 563,903.

*To all whom it may concern:*

Be it known that I, FRED RAU, a citizen of the United States, residing at Milwaukee, in the county of Milwaukee and State of Wisconsin, have invented new and useful Improvements in Antiskid Devices, of which the following is a specification.

This invention relates to anti skid devices for use upon motor vehicle wheels, and an object of the invention is to provide an anti skidding structure which may be carried by the vehicle wheel at all times, and moved into position about the tread portion of the vehicle tire to prevent skidding of the vehicle at any desired time, and from the driver's seat of the vehicle.

It is well known, that tire chains or anti skid chains of approved type now in use cause considerable wear upon the pneumatic tire casings particularly when running over paved streets and it is also well known that it is disagreeable and often difficult to put the tire chains about a tire or remove them therefrom owing to the fact that conditions are usually undesirable when the chains are necessary in that it is either raining or the road is muddy when the chains are needed causing considerable inconvenience to the user of the car when he gets out to apply the chains.

It is an object of this invention to provide a novel, efficient and practical anti skid device which will eliminate the above enumerated inconveniences in that it may be quickly and easily moved into position to prevent skidding of the vehicle without the driver leaving his seat.

More specifically the invention comprehends, a plurality of arcuate arms pivotally supported from a suitable attaching structure adapted to be carried by a wheel felly and normally held in inward inoperative position by a suitable release lever which is adapted to be released, by means operative from the driver's seat of the vehicle to permit the arms to be swung into engagement about the tread portion of the pneumatic tire.

Other objects of the invention will appear in the following detailed description taken in connection with the accompanying drawings wherein:

Fig. 3 is a fragmentary view, partly in section showing the improved anti skid device applied and illustrating one of the anti skid devices in inoperative position.

Fig. 4 is a detail section on the line 4—4 of Fig. 3.

Fig. 5 is a detail section on the line 5—5 of Fig. 3.

Fig. 6 is a fragmentary section taken on the line 6—6 of Fig. 4.

Figure 1:
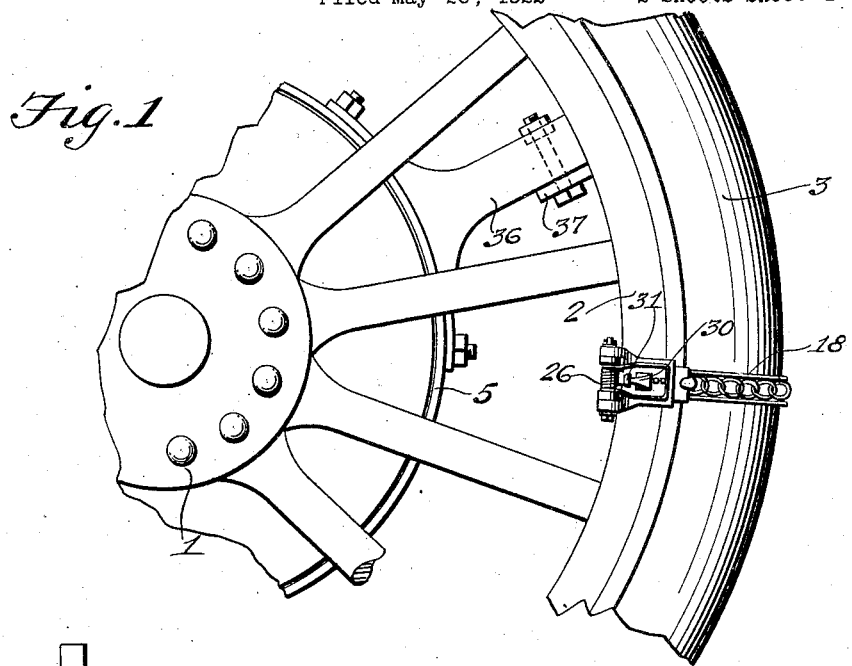
Fig. 1 is a fragmentary side elevation of the vehicle wheel showing one of the improved anti skid devices applied thereto.

Referring more particularly to the drawings, the improved anti skid device is shown as applied to a fragment of a vehicle wheel 1 which embodies a wheel felly 2 upon which a pneumatic tire 3 of approved type is mounted and as is usual in the construction of motor vehicles, the drive wheels have brake drums carried thereby (not shown) which are enclosed by the housings 5, which housings are in turn carried by the axle housing 6. The axle housing 6 and the brake drum housing 5 are stationary.

Figure 2:
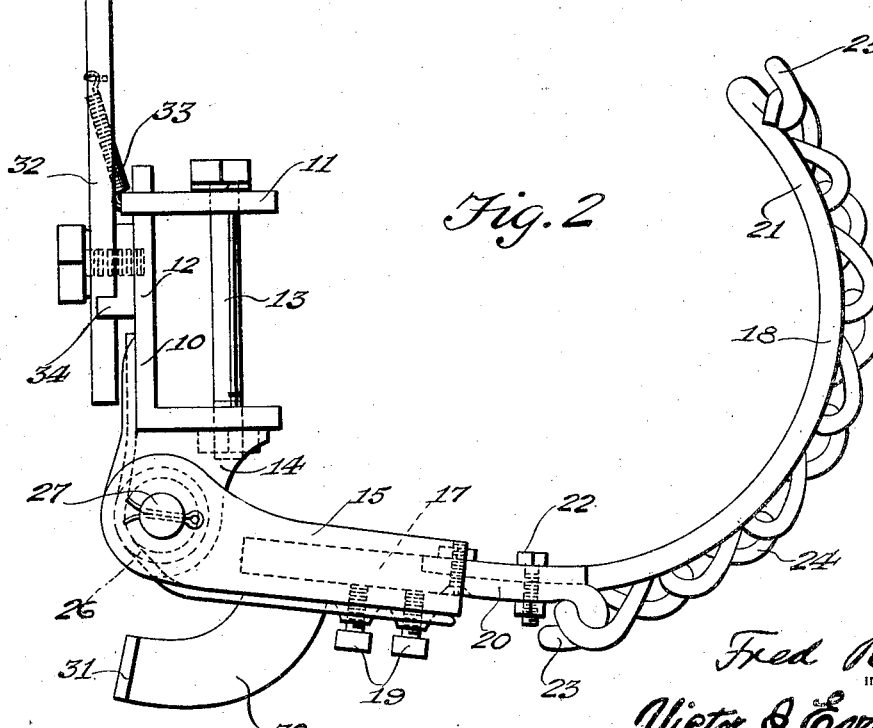
Fig. 2 is an elevation of one of the improved anti skid devices showing it in tire engaging position.

The improved anti skid device comprises an attaching bracket 10, the side 11 of which is adjustably supported upon the base portion 12 and is clamped into firm binding engagement with the wheel felly 2 by means of a bolt 13. The attaching bracket 10 has a bearing bracket 14 formed thereon to which an arm 15 is pivotally connected. The arm 15 is recessed as shown at 16 and slidably receives the straight end 17 of the arcuate chain carrying arm 18. Set screws 19 are provided for holding the arm 18 in adjustable positions relative to the arm 15 to permit the arm 18 to be adapted to properly fit tires of different sizes or to compensate for the wear on the tires occasioned by continued use. The arm 18 comprises the sections 20 and 21 which are adjustably connected by means of suitable bolts 22. The section 20 has a hook 23 thereon to which one end of the anti skid chain 24 is connected, while the section 21 has a hook 25 formed upon its outer free end into which the opposite end of the chain 24 engages. By adjustment of the sections 20 and 21 relative to each other the tension of the chain 24 may be regulated. The arms 15 and 18 are urged outwardly into tire engaging position as shown in Figs. 1 and 2 of the drawings by a coil spring 26 which is coiled about the pivot 27 of the arms 15 and 18 and engages the attaching bracket 10 and the arms 15 as shown in Fig. 6 at 28 and 29 respectively. An arcuate arm 30 is formed upon the arm 15 and it has a catch extension 31 thereon which is engaged by the pivotally mounted latch lever 32 to hold the arms 15 and 18 in the inward inoperative position as shown in Fig. 3 of the drawings, and the latch lever 32 is urged into latching position by means of the spring 33, while this movement under the tension of the spring 33 is limited by the stop 34.

A bracket arm 36 is carried by the stationary drum housing 5 and it pivotally supports a release lever 37 which is normally held out of operative position by means of a spring 38. A rope or cable 39 is connected to the lever 37 and extends about a suitable guiding sheave 40. The cable 39 is in turn connected to the angled end 41 of the pivotally mounted lever 42 and this lever 42 is pivotally supported by a bracket 43 which is in turn carried beneath the floor 44 of the motor vehicle equipped with the improved anti skidding devices. A rod 45 is connected to the lever 42 and extends upwardly through the floor 44 and has a head 46 upon its upper end by means of which the rod 45 may be depressed against the tension of the spring 47, for rocking the lever 42 to move the lever 37 into position where it will engage the latch levers 32 of the various anti skid devices as the vehicle wheel 1 rotates, releasing the catch levers 32 and permitting the arms 15 and 18 to be swung outwardly over the tread portions of the tires 3 and into position to prevent skidding of the vehicle wheel 1.

It is to be understood that any number of the anti skidding devices may be mounted about a vehicle wheel without departing from the spirit of this invention and that the anti skid devices upon both of the rear wheels are operated by depression of the rod 45, through the medium of the cables 39.

It is, of course, to be understood that the invention may be constructed in other manners and the parts associated in different relations and, therefore, I do not desire to be limited in any manner except as set forth in the claims hereunto appended.

Having thus described my invention what I claim is:

1. An anti-skid device comprising an attaching bracket, an arm pivotally carried by said attaching bracket, an arcuate chain carrying arm adjustably carried by said pivoted arm, said arcuate chain carrying arm comprising detachably connected sections.

2. An anti-skid device comprising an attaching bracket, an arm pivotally carried by said attaching bracket, an arcuate chain carrying an arm adjustably carried by said first named arm, a locking arm rigidly carried by said pivoted arm, means for moving said pivoted and arcuate arms into operative position, said locking arm adapted to engage said bracket to limit movement of the pivoted and chain carrying arms out of operative position.

3. An anti-skid device comprising an attaching bracket, an arm pivotally carried by said attaching bracket, an arcuate chain carrying arm adjustably carried by said pivoted arm, a spring engaging said pivoted arm for urging the chain carrying arm into operative position, a latch lever for restraining the arms from movement under action of said spring, a locking arm carried by said pivoted arm and adapted to be engaged by said latch lever, said locking arm adapted to engage said bracket to limit movement of the pivoted and arcuate chain carrying arms into inoperative position.

4. An anti-skid device comprising a pivoted arm, an arcuate chain carrying arm comprising detachably connected sections, chain engaging hooks carried by each of said sections, and means for attaching said pivoted arm to a wheel.

In testimony whereof I affix my signature.

FRED RAU.